United States Patent

Vudali et al.

[11] Patent Number: 5,867,787
[45] Date of Patent: Feb. 2, 1999

[54] OVERLOAD CONTROL FOR AN INTEGRATED MSC/HLR SWITCH

[75] Inventors: Madhusudham Vudali, Richardson; Steven W. Racz, Dallas, both of Tex.; Stephen Bird, Yateley; Imran Rehman, Maidenhead, both of United Kingdom; Kalyan Basu, Plano, Tex.

[73] Assignee: Northern Telecom Limited, Quebec, Canada

[21] Appl. No.: 509,136

[22] Filed: Jul. 31, 1995

[51] Int. Cl.[6] ............................... H04Q 7/20; H04Q 7/22
[52] U.S. Cl. ........................ 455/445; 455/433; 455/435
[58] Field of Search ..................... 379/57, 58, 59, 379/63; 455/33, 33.1, 423, 424, 429, 432, 433, 435, 436, 453, 507, 514, 525, 560, 561, 445, 438; 340/825.5

[56] References Cited

U.S. PATENT DOCUMENTS

| | | | |
|---|---|---|---|
| 4,670,899 | 6/1987 | Brody et al. | 455/33 |
| 5,097,499 | 3/1992 | Consentino | 379/59 |
| 5,123,111 | 6/1992 | Delory et al. | 455/429 |
| 5,257,399 | 10/1993 | Kallin et al. | 455/33.1 |
| 5,289,179 | 2/1994 | Beeson, Jr. et al. | 340/826 |
| 5,396,543 | 3/1995 | Beeson, Jr. et al. | 379/59 |
| 5,548,533 | 8/1996 | Gao et al. | 455/33.1 |
| 5,623,532 | 4/1997 | Houde et al. | 455/445 |

FOREIGN PATENT DOCUMENTS

0260763A2  9/1987  United Kingdom.

*Primary Examiner*—Wellington Chin
*Assistant Examiner*—Keith Ferguson
*Attorney, Agent, or Firm*—Finnegan, Henderson, Farabow, Garrett & Dunner, L.L.P.

[57] ABSTRACT

An integrated MSC/HLR switch accommodates overloads by throttling peripherals during MSC overload conditions, and halting TCAP messages and throttling peripherals during HLR overload conditions.

3 Claims, 2 Drawing Sheets

OVERLOAD CONTROL FOR AN INTEGRATED MSC/HLR SWITCH

I. BACKGROUND OF THE INVENTION

The present invention relates generally to the field of managing overload conditions in telecommunication switching equipment, and specifically to the field of controlling overloads in an integrated MSC/HLR switch used in GSM systems.

A GSM (Global System for Mobile communications) cellular radio system includes several Base Station Subsystems (BSSs) interconnected by one or more Mobile Switching Centers (MSCs). Each BSS provides radio links to Mobile Subsystems (MSs) in a respective cell, and at least one of the MSCs connects to the Public Switched Telephone Network (PSTN).

The MSCs control call routing. For example, the MSCs route calls from the PSTN to the BSSs currently serving called MSs, and from BSSs serving calling MSs to the PSTN for connecting to landline telephones. MSCs also route calls between BSSs for inter-MS calls.

In order to route calls to the BSSs currently serving called MSs, MSCs need to identify the cell in which each MS is currently located. To do so, the MSCs access a Home Location Register (HLR), which is a database storing the current location of all mobile stations in a GSM Public Land Network. The HLR also stores information about the services enabled for each MS and information used to control access by the MSs to the cellular radio system.

To maintain and provide current information, the HLR must process authentication requests, updates to MS location information, and updates to subscriber service information. In addition, The HLR must also download information to a Visitor Location Register (VLR) associated with each MSC. The VLR temporarily stores subscriber data associated with MSs currently located in cells served by the MSC. The HLR downloads subscriber data to the VLR in response to requests from the VLR to the HLR.

In a typical large GSM system, different systems implement the MSC and HLR functions, and the overload controls for both systems also differ. For example, in such systems, a CPU along with several peripheral processors provide each MSC function. The peripheral processors connect to BSSs, other MSCs, or switches of the PSTN. The interface between the peripheral processors and the BSSs is called the A-interface.

One technique for responding to MSC overload conditions is described in a copending patent application, U.S. Ser. No. 08/319,678 to Gao, et al., filed on Oct. 7, 1994 and entitled "Overload Control for a Central Processor in the Switching Network of a Mobile Communications Systems," which is incorporated herein by reference. To keep the MSC CPU operating efficiently, the MSC peripherals in this technique monitor the load on the MSC CPU and refuse transactions on the A-interfaces when the CPU is overloaded. The peripherals determine the possible overload condition from the queuing delay for transactions awaiting processing that the MSC CPU reports. When the queuing delay exceeds a threshold, the peripherals stop sending CPU transactions relating to the initiation of new calls. Calls for which processing has been started can complete, but new calls cannot initiate until the overload condition alleviates.

This overload control is particularly effective because the peripherals throttle the incoming transactions before they reach the CPU, thus relieving the CPU from devoting processing power to this task. The MSC peripherals can distinguish different types of transactions because the protocol used on the A-interface is "connection-oriented," meaning the transactions are read by each processor on the transmission path.

In contrast, typical large GSM systems implement the Home Location Register (HLR) function using a server connected to the MSCs via C-interfaces and D-interfaces. The HLR server monitors the number of incoming transactions in a queue awaiting processing. If the number of incoming transactions in the queue exceeds a "major overload" threshold, the HLR server discards incoming transactions and so informs the source of those transactions. This allows the source of the transactions to resend the transactions later when the overload condition may have been cleared. If the number of incoming transactions in the queue exceeds a "critical overload" threshold, the HLR server aborts the incoming transactions without even informing the source of the transactions.

Even if a system implements the HLR function with a CPU connected to peripherals, overload control for the HLR function will still differ from that for MSC functions because the peripherals on the C-interfaces and D-interface cannot throttle the incoming transactions. Those peripherals use a "connectionless," TCAP (Transaction Capabilities Address Point) protocol under which each processor on the transmission path reads only the address portion of the transaction. Those peripherals thus cannot distinguish different transaction types.

Smaller GSM systems present a different problem. In such systems, it is more cost effective to provide the MSC and HLR functions with a single CPU. This design requires controlling overloads to keep the single CPU operating efficiently while recognizing the relative priorities of the MSC and HLR roles. On the other hand, such an integrated design offers unique advantages.

In light of the foregoing, there is a need for overload control for an integrated switch providing both MSC and HLR functions with a single CPU.

Another need is for such control while recognizing the proper priorities of the MSC and HLR operations.

Still another need is for overload control that follows accepted protocols.

Additional features and advantages of the invention will be set forth in the following description and will be apparent from the description and practice of the invention.

II. SUMMARY OF THE INVENTION

To achieve these and other advantages and in accordance with the purpose of the invention, as embodied and broadly described herein, the integrated switch of this invention reduces MSC messages during an HLR overload condition.

In particular, an integrated MSC/HLR switch according to this invention receives MSC and HLR messages and comprises HLR overload detect means for detecting an HLR overload condition and generating an HLR overload signal in response to the HLR overload condition, and throttling means, responsive to the HLR overload condition signal, for signalling the need for reducing the number of MSC messages received by the switch means.

In addition, a system according to this invention for countering overload conditions in an integrated MSC/HLR switch receiving MSC and HLR messages comprises a CPU with an HLR portion and an MSC portion, and peripheral devices, coupled to the CPU, with means for limiting the messages sent to the CPU in response to the throttling means. The HLR portion includes means for storing HLR configuration information, and means for detecting an HLR overload condition and generating an HLR overload condition signal in response to the HLR overload condition. The MSC portion includes means for switching MSC messages, means for detecting the presence of an MSC overload condition and for generating an MSC overload condition signal in response to the MSC overload condition, and throttling means, responsive to the HLR overload condition signal and the MSC overload condition signal, signalling the need for reducing the number of MSC messages received by the switch means.

Both the foregoing general description and the following detailed description are exemplary and explanatory. They provide further explanation of the invention as claimed.

III. BRIEF DESCRIPTION OF THE DRAWINGS

The accompanying drawings, which are incorporated in and constitute part of this specification, illustrate presently preferred implementations of the invention that, together with the description, explain the invention and its principles.

IV. DESCRIPTION OF PREFERRED EMBODIMENTS

Figure 1:
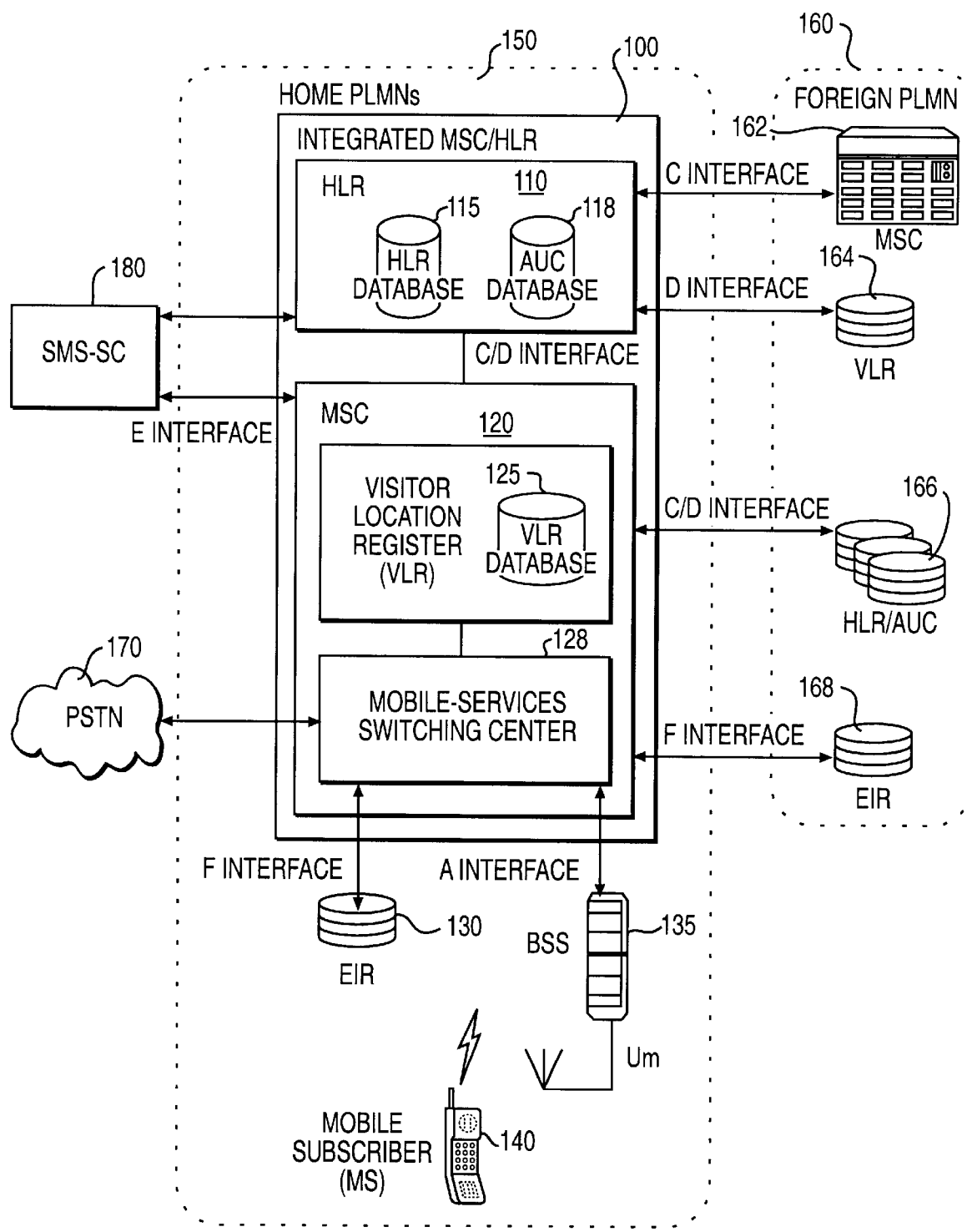
FIG. 1 shows a presently preferred embodiment of a switch in accordance with this invention.

FIG. 1 is a diagram of an integrated MSC/HLR switch 100 for use in a GSM environment in accordance with this invention. Switch 100, which is essentially a central processing unit, is in a Home Public Land Mobile Network (PLMN) 150. As FIG. 1 shows, Home PLMN 150 includes an equipment identification register (EIR) 130, BSS 135, and MS 140. Home PLMN 150 also connects to Foreign PLMN 160, PSTN 170, and Short Message Service-Service Center SMS-SC 180.

Switch 100 includes two portions: HLR portion 110 and MSC portion 120. Both portions are preferably implemented in software but can be implemented at least partially in hardware.

HLR portion 110 includes an HLR database 115 and an AUC database 118 (for authentication). MSC portion 120 includes VLR 125 as well as the mobile services switching center functionality 128.

HLR portion 110 includes circuitry or software to detect an HLR overload condition and generate an HLR overload condition signal in response to that condition. MSC portion 120 similarly includes circuitry or software to detect an MSC overload condition and generate an MSC overload condition signal in response to that condition. MSC portion 120 also includes throttling circuitry or software, responsive to the HLR overload condition signal, for signalling the need for reducing the number of MSC messages received by the switch means.

The A-interface connects BSS 135 to MSC/HLR switch 100. The majority of traffic occurs on the A-interface. Included in BSS 135 are peripherals that use the connection-oriented peripherals in accordance with GSM protocol. The BSS peripherals have circuitry or software to limit the messages sent to the CPU in response to MSC portion 120 signalling of a need to reduce MSC messages. This operation is described in greater detail below.

In FIG. 1, a C-interface connects MSC 162 in Foreign PLMN 160 to HLR portion 110, and a D interface connects VLR 164 in foreign PLMN 160 to the HLR portion 110. A C/D interface connects the HLR/AUC system 166 in Foreign PLMN 160 to MSC portion 120, and another a C/D interface connects HLR portion 110 and MSC portion 120 in switch 100. In general, the C-interfaces connect between MSCs and the HLRs, and the D-interfaces connect between the VLRs and the HLRs. These interfaces are often lumped together, however.

FIG. 1 also shows three other interfaces. An E-interface connects SMS-SC 180 to the MSC portion 120, and an F-interface connects EIR 168 in Foreign PLMN 160 and EIR 130 in Home PLMN 150 to mobile services switching center 128. The SMS-SC also connects to HLR portion 110 via an SS7 interface.

In accordance with the preferred implementation of this invention, the integrated MSC/HLR switch 100 executes both the MSC and HLR overload controls, which are preferably software procedures. Consistent with nonintegrated systems, the MSC overload control monitors the queuing delay for MSC transactions and reports that delay in a manner that the BSS peripherals can detect. Those peripherals perform overload control functions using this information and throttle selected transactions on the A-interface when necessary to keep the queuing delay within acceptable bounds.

The HLR overload control operates on the C-interface and the D-interface in the same manner that conventional systems do: When the number of HLR transactions awaiting processing exceeds a threshold, the HLR overload control discards HLR transactions arriving on the C- and D-interfaces to keep the number of queued HLR transactions within acceptable bounds. Specifically, HLR portion 110 enqueues incoming TCAP messages in an HLR work queue in HLR portion 110. HLR overload periodically control examines the size of this queue to determine whether the overload status is normal or in one of several overload conditions: Minor overload, Major overload, Critical overload.

When an overload condition occurs, HLR overload control will either abort or discard the incoming TCAP messages on the C- and D-interfaces depending upon the state of the overload. Normally, this is all HLR overload control can do in a nonintegrated system. In an integrated switch such as switch 100, however, this action may be insufficient because traffic can enter on all interfaces.

Consequently, when the number of HLR transactions awaiting processing exceeds the threshold, HLR overload control, according to this invention, sends an overload indication, through the MSC portion 120, to BSS peripherals to throttle incoming MSC transactions at the A-interface. This invention thus properly recognizes that HLR transactions should receive priority over MSC transactions.

Preferably, HLR overload control does not throttle all the BSS peripherals. Traffic studies characterizing typical overload conditions show no need for such drastic action. Instead, one may achieve suitable overload control by sending the overload indications to about one fifth of the peripherals.

In the preferred implementation, a data table in MSC portion 110 divides the peripherals into five groups of roughly equal size. When an overload condition is detected, HLR overload control makes overload indications available to a group of peripherals. Then, at one second intervals thereafter, HLR control sends overload indications to different groups of peripherals in some pattern until the overload condition clears.

Thus, the HLR portion 110 and the MSC portion 120 must jointly perform overload control, and must do so without violating GSM standards. This invention, however, allows HLR overload control to effect more overload control. In an integrated switch the HLR portion 110 and the MSC portion 120 reside on the same switch 100. HLR overload control in portion 110 can thus take advantage of this coresidency with MSC portion 120 to reduce A-interface traffic. The A-interface is logically connected only to MSC portion 120, but in an integrated system, HLR overload control in portion 110 can send control messages to the A-interface (i.e., BSS) peripherals through the MSC portion 120 to throttle new traffic.

This invention implements a theory that the best way to stabilize switch 100 in overload conditions is to shed work at the switch's entry points, particularly the peripherals. The best place to do this in GSM systems is at the A-interface because, as explained above, the majority of traffic occurs on the A-interface in such systems. Also, the connection-oriented peripherals, specifically those on the A-interface, allow such shedding in accordance with the GSM protocol.

The overload controls according to this invention do not violate any of the GSM standards, because the overload controls for the MSC and HLR in the nonintegrated system provide all the functions provided in the integrated system. Instead, this invention uses those standards creatively by adding an HLR System Overload Control (HLRSOC) procedure.

Figure 2:
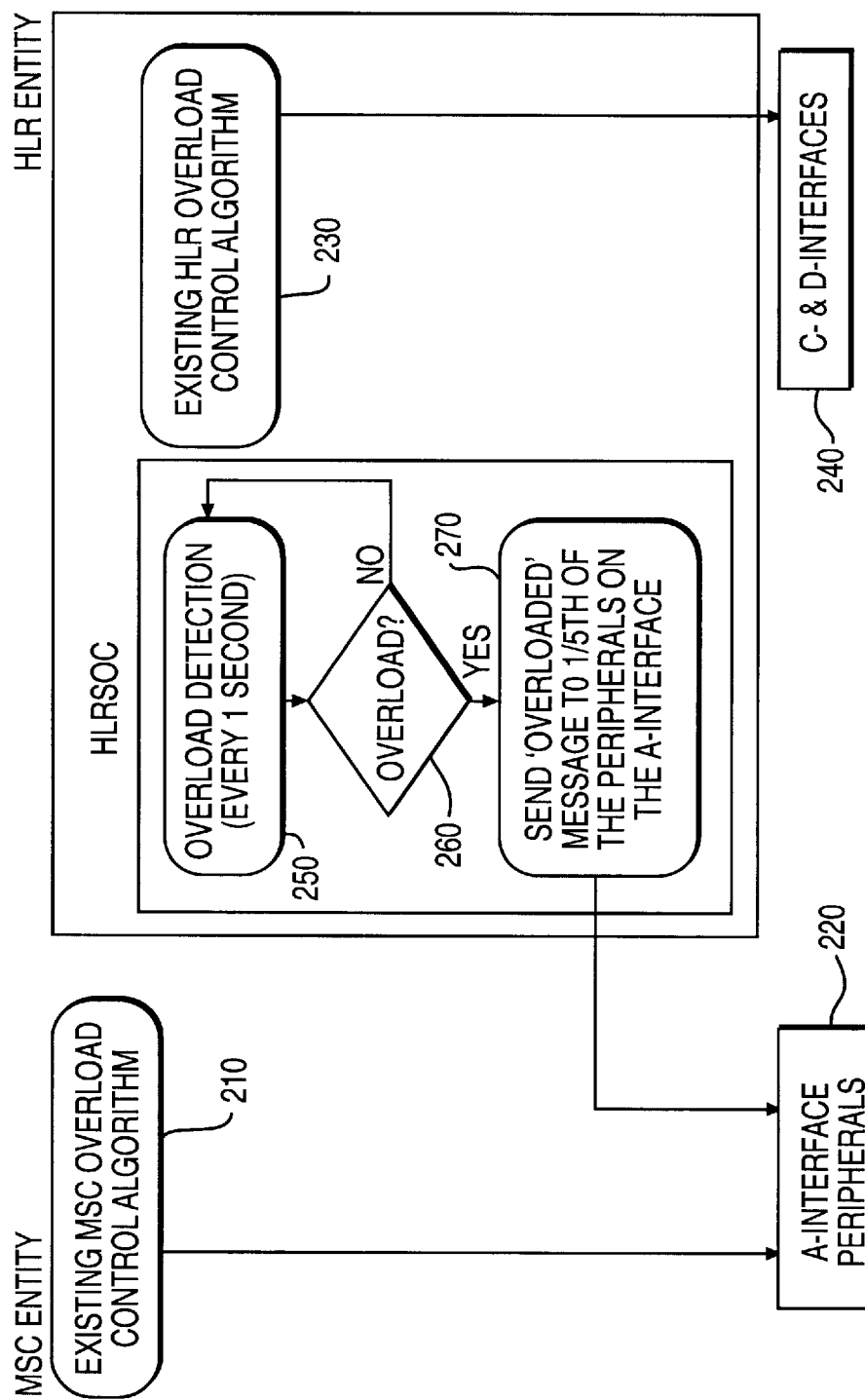
FIG. 2 shows a diagram of a preferred implementation of procedures to implement overload control in accordance with this invention.

FIG. 2 shows an example of the relationship between the HLRSOC and standard MSC and HLR overload controls. In the existing system, an MSC overload control 210 informs the A-interface peripherals (step 220) when MSC overload conditions occur. Similarly, the HLR overload control algorithm 230 sends discard messages to the C- and D-interfaces when HLR overload conditions occur (step 240).

As FIG. 2 shows, HLRSOC procedure 250 queries the existing HLR overload control algorithm (230) every second to look for an overload detection. When one occurs (step 260), HLRSOC sends a message to selected peripherals on the A-interface (one fifth in the preferred implementation) (step 270). Adhering to the protocol established for the MSC overload controls, those certain peripherals will throttle connection-oriented messages.

This overload control recognizes the fact that the HLR's traffic is to due principally to MSC activity. Thus, when HLR portion 110 becomes overloaded, it alleviates that condition by throttling the MSC traffic. Favoring HLR work over MSC work in this manner is proper, especially when the HLR serves other MSCs as well.

In addition, it is better to use the connection-oriented messaging protocol of the A-interface to restore nodal stability rather than the connectionless messaging protocols on the C- and D-interfaces. The connection-oriented messaging protocol on the A-interface allows the peripherals to do the actual throttling, thereby relieving the MSC of such responsibilities.

This system accommodates all the combinations of overload scenarios. For example, if MSC portion 120 is in overload but the HLR portion 110 is not, the overload condition protocol reacts normally to throttle new attempts to make connections on the A-interface.

On the other hand, if HLR portion 110 is in overload on the A-interface, but MSC portion 120 is not, then the HLRSOC will reduce A-interface traffic, as well as discard locally generated transactions, to allow the HLR to stabilize.

If HLR portion 110 is in overload because the external C- and D-interfaces, but MSC portion 120 is not in overload, then the HLR portion 110's internal mechanism will begin aborting transactions and, as indicated above with regard to FIG. 2, will cause throttling of A-interface traffic. This will reduce total nodal loading and allow HLR portion 110's overload control to continue to handle the overload state caused by the external traffic. This allows HLR portion 110 to use as much as switch 100's capacity as possible to reduce its overload condition without starving the MSC portion 120 of work.

If both HLR portion 110 and MSC portion 120 are in overload from all interfaces, stabilization will occur quickly. Both HLR portion 110 and MSC portion 120 will send "overloaded" messages to the peripherals which will reduce traffic to the lowest level possible. HLR portion 110 will gain processing time at MSC portion 110's expense, but the overall nodal loading will be reduced.

It will be apparent to those skilled in the art that various modifications and variations can be made in the disclosed process and product without departing from the scope or spirit of the invention. For example, although the invention is described in this preferred embodiment with reference to GSM, it also applies to other mobile radio systems such as TACS, AMPS, 15–54.

Other embodiments of the invention will be apparent to those skilled in the art from consideration of the specification and practice of the invention disclosed herein. The specification and examples are exemplary only. The true scope and spirit of the invention are defined by the following claims.

What is claimed is:

1. A system for countering overload conditions in an integrated Mobile Switching Center (MSC)\Home Location Register (HLR) switch receiving MSC and HLR messages, the system comprising:

a CPU with an HLR portion and an MSC portion;

the HLR portion including
database means for storing HLR configuration information,
HLR overload detect means for generating an HLR overload condition signal in response to an HLR overload condition;

the MSC portion including
means for routing MSC messages,
MSC overload detect means for detecting the presence of an MSC overload condition and for generating an MSC overload condition signal in response to the MSC overload condition, and
throttling means, responsive to the HLR overload condition signal and the MSC overload condition signal, for signaling the need for reducing the number of MSC messages received by the switch; and
peripheral devices, coupled to the CPU, said peripheral devices including means for limiting the messages sent to the CPU in response to the throttling means.

2. The switch of claim 1 wherein the throttling means includes
means, responsive to the HLR overload condition signal, for signalling selected ones of the peripherals to stop sending MSC messages.

3. The switch of claim 2 wherein a plurality of peripherals connect to the switch, and
wherein the throttling means includes means, responsive to the HLR overload condition signal and the timer means, for signalling different groups of selected ones of the peripherals to stop sending MSC messages.

* * * * *